(12) United States Patent
Htay

(10) Patent No.: US 12,019,615 B2
(45) Date of Patent: Jun. 25, 2024

(54) PROOF OF ASSET VALUE FOR TRANSACTION VALIDATOR ELECTION

(71) Applicant: Ciena Corporation, Hanover, MD (US)

(72) Inventor: Aung Htay, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 156 days.

(21) Appl. No.: 17/537,982

(22) Filed: Nov. 30, 2021

(65) Prior Publication Data

US 2023/0169062 A1 Jun. 1, 2023

(51) Int. Cl.
*G06F 16/23* (2019.01)
*H04L 9/30* (2006.01)

(52) U.S. Cl.
CPC .......... *G06F 16/2365* (2019.01); *H04L 9/30* (2013.01)

(58) Field of Classification Search
None
See application file for complete search history.

(56) References Cited

U.S. PATENT DOCUMENTS

| | | | |
|---|---|---|---|
| 9,875,510 B1 * | 1/2018 | Kasper | G06Q 40/12 |
| 10,965,527 B2 | 3/2021 | Triplet et al. | |
| 11,487,850 B1 * | 11/2022 | Nieto | G06F 16/27 |
| 11,501,370 B1 * | 11/2022 | Paya | G06Q 20/3676 |
| 2017/0323392 A1 * | 11/2017 | Kasper | H04L 63/123 |
| 2019/0370793 A1 * | 12/2019 | Zhu | G06Q 20/06 |
| 2020/0013027 A1 * | 1/2020 | Zhu | H04L 9/50 |
| 2020/0106623 A1 * | 4/2020 | Andreina | H04L 9/3247 |
| 2020/0296111 A1 * | 9/2020 | Karame | H04L 9/3239 |
| 2020/0394648 A1 * | 12/2020 | Blackshear | H04L 63/12 |
| 2021/0056547 A1 * | 2/2021 | Monica | H04L 9/0637 |
| 2021/0209885 A1 * | 7/2021 | Lundin | H04L 9/3239 |
| 2022/0012731 A1 * | 1/2022 | DeRosa-Grund | G06F 16/2365 |
| 2022/0076518 A1 * | 3/2022 | Byun | G06Q 30/0203 |
| 2022/0129441 A1 * | 4/2022 | Waite | G06F 16/23 |
| 2022/0374886 A1 * | 11/2022 | Micali | H04L 9/50 |
| 2023/0315904 A1 * | 10/2023 | Lemieux | G06F 16/27 |
| | | | 705/3 |

OTHER PUBLICATIONS

Leonardos et al. "Weighted Voting on the Blockchain: Improving Consensus in Proof of Stake Protocols," 2019 IEEE International Conference on Blockchain and Cryptocurrency (ICBC), 2019, doi: 10.1109/BLOC.2019.8751290. URL Link: <https://ieeexplore.ieee.org/document/8751290>. Accessed Jun. 2023. (Year: 2019).*

(Continued)

*Primary Examiner* — Irene Baker
(74) *Attorney, Agent, or Firm* — Young Basile Hanlon & MacFarlane, P.C.

(57) ABSTRACT

Transaction validation includes assigning respective asset stake values to computing assets of network services. A request to assign a transaction validation stake to a transaction validator is received. At least some of the computing assets are assigned to the transaction validator. Responsive to a request for one or more transaction validators, a response that includes an indication of the transaction validator is provided. The transaction validator is selected using the respective asset stake values of the at least some of the computing assets that are assigned to the transaction validator.

18 Claims, 10 Drawing Sheets

(56) References Cited

OTHER PUBLICATIONS

WisdomTree Market Insight. "Consensus Mechanism Overview". Published Aug. 2021. URL Link: < https://www.wisdomtree.eu/-/media/eu-media-files/other-documents/research/market-insights/wisdomtree_market_insight_consensusmech_en.pdf>. Accessed Jun. 2023. (Year: 2021).*

Novum Insights. "Slashing Penalties—The Long Term Evolution of Proof of Stake (POS)". Published Mar. 11, 2021. URL Link: <https://novuminsights.com/post/slashing-penalties-the-long-term-evolution-of-proof-of-stake-pos/>. Accessed Jun. 2023. (Year: 2021).*

Chalopin et al. "A Proof of Stake Explanation". Published Jul. 14, 2021. Deltec Bank. URL Link: <https://www.deltecbank.com/2021/07/14/a-proof-of-stake-explanation/?locale=en>. Accessed Jun. 2023. (Year: 2021).*

Xiao, Yang, et al. "A survey of Distributed Consensus Protocols for Blockchain Networks." IEEE Communications Surveys & Tutorials 22.2, pp. 1432-1465, Jan. 29, 2020.

* cited by examiner

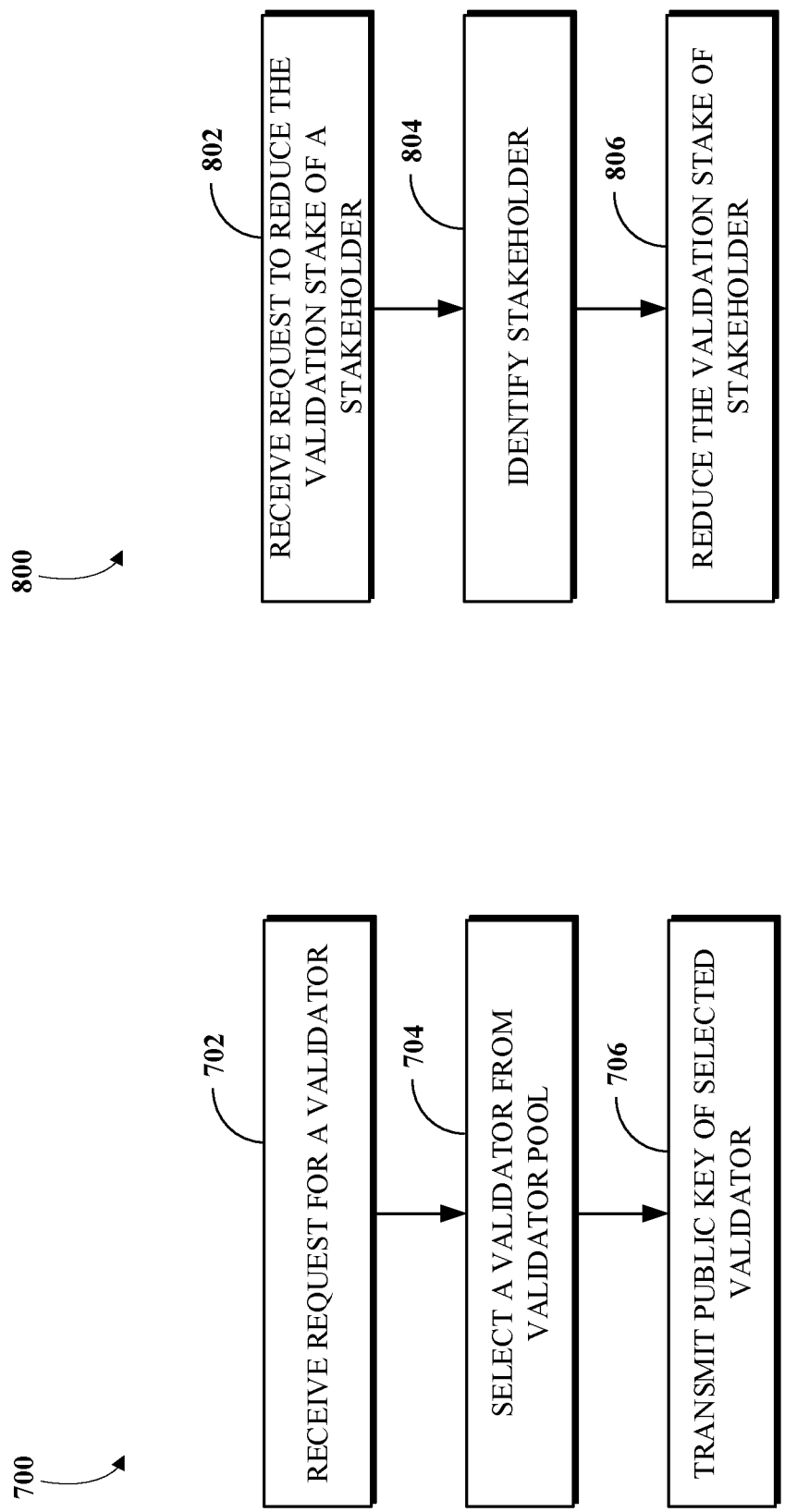

PROOF OF ASSET VALUE FOR TRANSACTION VALIDATOR ELECTION

TECHNICAL FIELD

This disclosure relates to distributed transactions ledger and more specifically to validator election based on proof of computing asset value.

SUMMARY

An aspect is a method of transaction validation. The method can include assigning respective asset stake values to computing assets of network services; receiving a request to assign a transaction validation stake to a transaction validator; assigning at least some of the computing assets to the transaction validator; and, responsive to a request for one or more transaction validators, providing a response that includes an indication of the transaction validator. The transaction validator can be selected using the respective asset stake values of the at least some of the computing assets that are assigned to the transaction validator.

An aspect is a device that includes a memory and a processor. The processor is configured to execute instructions stored in the memory to assign respective asset stake values to computing assets; receive a request to assign a transaction validation stake to a transaction validator; assign at least some of the computing assets to the transaction validator; and, responsive to a request for one or more transaction validators, provide a response that includes an indication of the transaction validator. The transaction validator can be selected using the respective asset stake values of the at least some of the computing assets that are assigned to the transaction validator.

An aspect is a non-transitory computer readable medium storing instructions operable to cause one or more processors to perform operations including assigning respective asset stake values to computing assets of network services; receiving a request to assign a transaction validation stake to a transaction validator, where the request includes a public key of the transaction validator and respective keys of delegate validators associated with the transaction validator; assigning at least some of the computing assets to the transaction validator; and, responsive to a request for one or more transaction validators, providing a response that includes the public key and the respective keys of delegate validators.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a flowchart of an example of a technique for validator selection.

FIG. 8 is a flowchart of an example of a technique for reducing the stake of a stakeholder.

DETAILED DESCRIPTION

Figure 1:
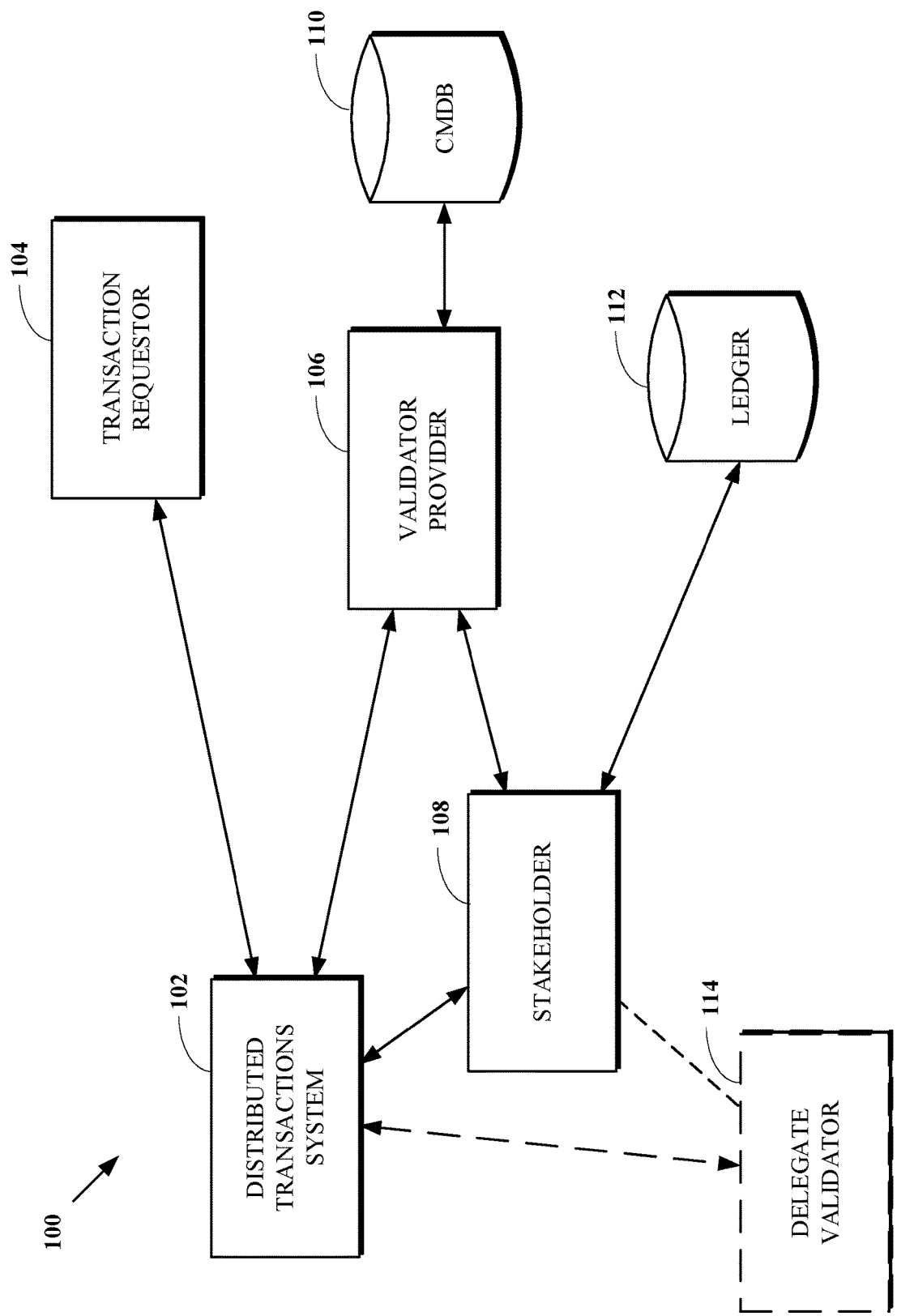
FIG. 1 is a block diagram of a computing environment where validator selection can be performed.

Traditional transaction management systems or processes typically include a central entity or system that manages and validates transactions. However, more recent approaches to transaction management do not include such central entities. Rather, transaction validation may be performed by entities referred to herein as "transaction validators" (or simply "validators"). Blockchain is an example of a distributed transaction management and validation system. As is known, a blockchain is a structure for storing digital transactions or data in an immutable, distributed, and decentralized digital ledger. A blockchain-based system is a cryptography based system where transactions are recorded in a chain of blocks. The blocks of a blockchain are linked via cryptographic signatures. Each block in the chain is connected to the immediately preceding and immediately succeeding blocks in the chain.

Participants (referred to herein also as "stakeholders" or "nodes") in a blockchain system compete for the privilege of validating (i.e., adding, minting, forging, mining) blocks. More specifically, a "stakeholder" as used herein, refers to an entity that desires to have or has a computing device (e.g., a node, a server) that is a validator. A validator (i.e., a transaction validator), as used herein, refers to a computing device that can perform, inter alia, block validation functions. The validator is configured (e.g., programmed) to participate in the distributed transaction system according to the technical processes and requirements prescribed by the distributed transaction system. As such, the validator may be configured to monitor for and respond to broadcast messages; receive, perform, and/or respond to requests directly addressed to the validator; and the like.

A consensus protocol (mechanism) of the distributed transaction system determines whether a block validated (and added to the chain) by a validator is valid (e.g., not fraudulent, does not include altered transaction data, etc.). Via an election protocol, the distributed transaction system can select which node(s) is(are) allowed (or selected) to validate a block add a new block to the chain. Many different consensus protocol have been proposed or are in use, including a proof-of-work and proof-of-stake (PoS). Participants stake (e.g., deposit, pledge), and hence the term "stakeholder," digital coins or tokens for the privilege of being selected as validators. In some implementations, such as those known as proof-of-stake (PoS) systems, one validator may be selected from amongst many to validate a block based the respective sizes of the stakes of the stakeholders.

The validator is rewarded (such as by paying a fee to the validator) for validating and creating new blocks that are determined to be valid. The validator is punished (such as be reducing the stake of validator) for creating invalid blocks.

The cost of an invalid block (e.g., a malicious error) is typically greater than the reward. Once a block is created by a validator, the validator shares the block with all other participants in the blockchain network. Once a sufficient number of the participants attest to the validity of the block, the block is confirmed for inclusion in the blockchain and the validator receives its reward. The reward/punishment system has the technical benefits of ensuring, inter alia, data integrity, tamper free blocks, resiliency, immutability, and traceability by disincentivizing maliciousness of validators more than incentivizing non-malicious validation.

Implementations according to this disclosure provide techniques for validator selection where participating nodes (nodes of stakeholders) acquire and pledge stakes in computing assets (or "assets" for brevity) of a computing infrastructure. The entity providing validation selection and the entity that manages or owns the computing infrastructure may be the same or different entities. Regardless, the entity that manages or owns the computing infrastructure is referred to herein as "asset holder". The asset holder may assign asset stake values (ASVs) to assets of the computing infrastructure. A stakeholder may request, and the asset holder may assign ASVs to the stakeholder based on the request. The sum of the ASVs assigned to a stakeholder, regardless of how calculated as further described below, is referred to herein is a "validation stake." A stakeholder can be selected as a block validator based on its validation stake. The asset holder may be requested to increase or decrease the assigned ASV of the stakeholder as described above with respect to reward and punishment.

Implementations according to this disclosure can synchronize real time computing assets, including network computing asset, with offline computing asset data with delegated proof-of-asset-value (e.g., proof-of-stake) data into a single unified model. The unified model can be stored or represented in any suitable store, such as a graph database. Implementations according to this disclosure can or can be used to build end-to-end views of computing assets (including physical or virtual network computing assets and logical services running over a computing infrastructure that includes the computing assets).

In an example, a stakeholder can be an entity to whom assets are assigned or provisioned by the asset holder. In an example, the asset holder may assign or provision, to a stakeholder, a network service, which uses some of the assets of the computing infrastructure. To illustrate, the asset holder may be a telecommunications provider, the stakeholder may be a multi-location business, and the network service is a service provided by the asset holder for connecting business locations together. The network service may include or use a set of assets (e.g., network switches, servers, communication lines, etc.), specified route, configurations, or the like of the assets that enable or provide the network service to the stakeholder. As another example, the network service may be a platform-as-a-service (PaaS), a software-as-a-service (SaaS), or an infrastructure-as-a-service (IaaS).

A "computing asset" can be a physical or a virtual asset, such as a virtualized network function (VFN). A computing asset can be a hardware or a software asset. A computing asset can be or include a set of other computing assets. More generally, a computing asset can be any computing resource to which a relative value, as compared to other computing assets, can be assigned. A computing asset can have or provide, as a standalone asset or in conjunction with other computing assets, a valuable computing (e.g., telecommunication) service to users of the computing asset. To illustrate, examples of hardware components include switches, routers, servers, modems, processors, I/O interfaces, memory or storage, power supplies, biometric readers, media readers, an optical transponder, a service channel interface, and so on; and a software asset can be an applicative resource, such as a platform application, a module, a routine, a firmware process, a software communications platform, an electronic shopping cart service/module usable in commerce applications, a product data management software platform, a network monitoring and management tool, an email software platform, other instructions executable by or in connection with infrastructure resources.

FIG. 1 is a block diagram of a computing environment 100 where validator selection can be performed. The computing environment 100 is shown as including a distributed transactions platform 102, a transaction requestor 104, a validator provider system 106 which may be connected to a configuration management database (CMDB) 110, and a stakeholder 108, which includes (e.g., manages, stores) a distributed ledger 112 (i.e., copies at least a partial copy of a distributed ledger). For simplicity, the computing environment 100 is shown as including one stakeholder and one transaction requestor; however, in reality the computing environment 100 would include many more stakeholders and transaction requestors. Additionally, the stakeholder 108 is one or more computing devices of respective stakeholder entities; and the transaction requestor 104 is one or more computing devices of respective transaction requestor entities.

The distributed transactions platform 102 may implement (e.g., enable, facilitate, coordinate) a distributed ledger of transactions. The distributed transactions platform 102 can implement the programmatic agreement, amongst stakeholders, of information to be stored on the distributed ledger through a consensus mechanism with respect to the status of, or changes to, certain shared (e.g., transaction) data. The distributed transactions platform 102 can be or implement a blockchain system where transactions can be grouped together and organized chronologically into blocks that are interconnected to each other and secured using cryptography. The distributed transactions platform 102 can be public such that any entity may choose to participate (e.g., to be a validator) without permission, or private (i.e., permissioned) where only authorized entities can participate.

The transaction requestor 104 may transmit the data of a transaction to the distributed transactions platform 102 for inclusion in the distributed ledger, a copy of which is the distributed ledger 112. The transaction data can be any data that the distributed ledger 112 of the computing environment 100 is created (e.g., designed, intended, instantiated, deployed) to be used for. In an example, the transaction requestor 104 may use asymmetric cryptography to digitally sign the transaction data using a private key of the transaction requestor 104.

The disclosure herein is not limited to any type or domain of transaction data. For example, the transaction data can be or include supply chain, healthcare, retail, telecommunications, manufacturing, insurance, financial services, or other domain data. To illustrate, the transaction data may include configuration changes to network components, which may be managed in the CMDB 110; the transaction data may include data that trace produce from store shelves back to the point of origin; the transaction data may include data for proving the authenticity of high-priced goods; and so on.

The distributed transactions platform 102 may receive one or more requests to add transaction data to the distributed ledger 112 from one or more transaction requestors, such as the transaction requestor 104. The distributed transactions platform 102 may wrap one or more of the transactions into a transaction batch. The distributed transactions platform 102 transmits a request to the validator provider system 106 for validators. That is, the distributed transactions platform 102 obtains from the validator provider system 106 a list of one or more validators to whom a request for validating the transaction batch is submitted. The list of the one or more validators may include the stakeholder 108. As such, a request to validate the transaction batch is transmitted to the stakeholder 108.

As further described below, the stakeholder 108 may have or be associated with one or more delegate validators 114. In some configurations of distributed transaction systems, the roles of staking and the role block validation can be separated. As such, a stakeholder can delegate block validation to a delegate validator. As such, that a transaction batch is transmitted to the stakeholder 108 encompasses transmitting the transaction batch to one of the one or more delegate validators 114. Additionally, that the distributed transactions platform 102 obtains from the validator provider system 106 the list of the one or more validators can mean that the validator provider system 106 transmits public keys associated with the stakeholder and the delegate validators 114, if any.

The stakeholder 108, or one of the delegator validators 114 of the stakeholder 108, receives a transaction batch for validation. The stakeholder 108 may be selected based on an validation stake of the stakeholder 108 and which the stakeholder 108 may have previously requested from the validator provider system 106, as further described herein. The stakeholder 108, or the delegator validator, validates each of the transactions in the transaction batch. The semantics of transaction validation can depend on the application of the distributed ledger 112. In an example, validating a transaction can include validating that the transaction is in fact signed by the entity (i.e., the transaction requestor) that requested the transaction. In an example, validating a transaction can include verifying at least one of the accuracy, completeness, or validity of the transaction data. Other transaction validation semantics are possible. However, regardless of the semantics, the stakeholder 108 hashes and signs the block using a private key of the stakeholder 108 and adds (e.g., proposes for addition) the block to the ledger 112.

As a reward for adding a valid block to the ledger 112, the stakeholder 108 can receive a transaction fee, which may be a percentage of the value stacked by the stakeholder 108 (i.e., a percentage of the assigned ASV of the stakeholder 108) or a fixed transaction fee. The fee may be paid in the currency (e.g., a crypto currency, an asset value stake) associated with the blockchain. In an example, the distributed transactions platform 102 can initiate a request to the validator provider system 106 to give the reward to the stakeholder 108. In an example, giving the reward to the stakeholder 108 can include increasing the validation stake of the stakeholder 108 according to the reward value. In a case that it is determined that the stakeholder 108 added an invalid block to the ledger 112, the distributed transactions platform 102 can initiate a request to the validator provider system 106 to reduce the validation stake of the stakeholder 108.

The CMDB 110 may be populated with records (referred to herein as configuration items (CIs)) corresponding to aspects of a computing infrastructure. As such, the CMDB 110 can, for example, store information about hardware and software computing assets in respective CIs. CIs may correspond to assets of the computing infrastructure, connectivity information between assets, groupings of some assets into services, software assets, hardware assets, virtual assets, and so on.

CIs can include metadata (e.g., attributes). To illustrate, a CI corresponding to a server asset may include attributes describing the operating system version running on the server, the amount of random access memory available on the server, the ports that are open, and so on; and a CI corresponding to a software asset may include a build level, a patch level, required libraries, and so on. Examples of configuration items my include service CIs (e.g., email, printing, collaboration, user registration), software CIs (e.g., applications, databases, virtual machines, virtual containers), device CIs (e.g., laptops, tablets, monitors, keyboards), hardware (e.g., servers, routers, switches, printers), and so on. The CMDB 110 may be manually populated, automatically populated, or a combination thereof. In an example, computing infrastructure discovery tools may be used to discover assets in the computing infrastructure and populate CI and/or information related thereto in the CMDB 110. In an example, the CMDB 110 may be populated from data obtained from one or more Element Management Systems (EMSs), as further described below.

At least some of the computing assets represented (using CIs) in the CMDB 110 may have ASVs. The CMDB 110 may also include information regrading stakeholders and their respective validation stakes. The CMDB 110 may be implemented using, for example, one or more relational database management systems (RDBMS), object databases, graph database, XML databases, flat files, or any mechanism for permanently storing data.

Figure 2:
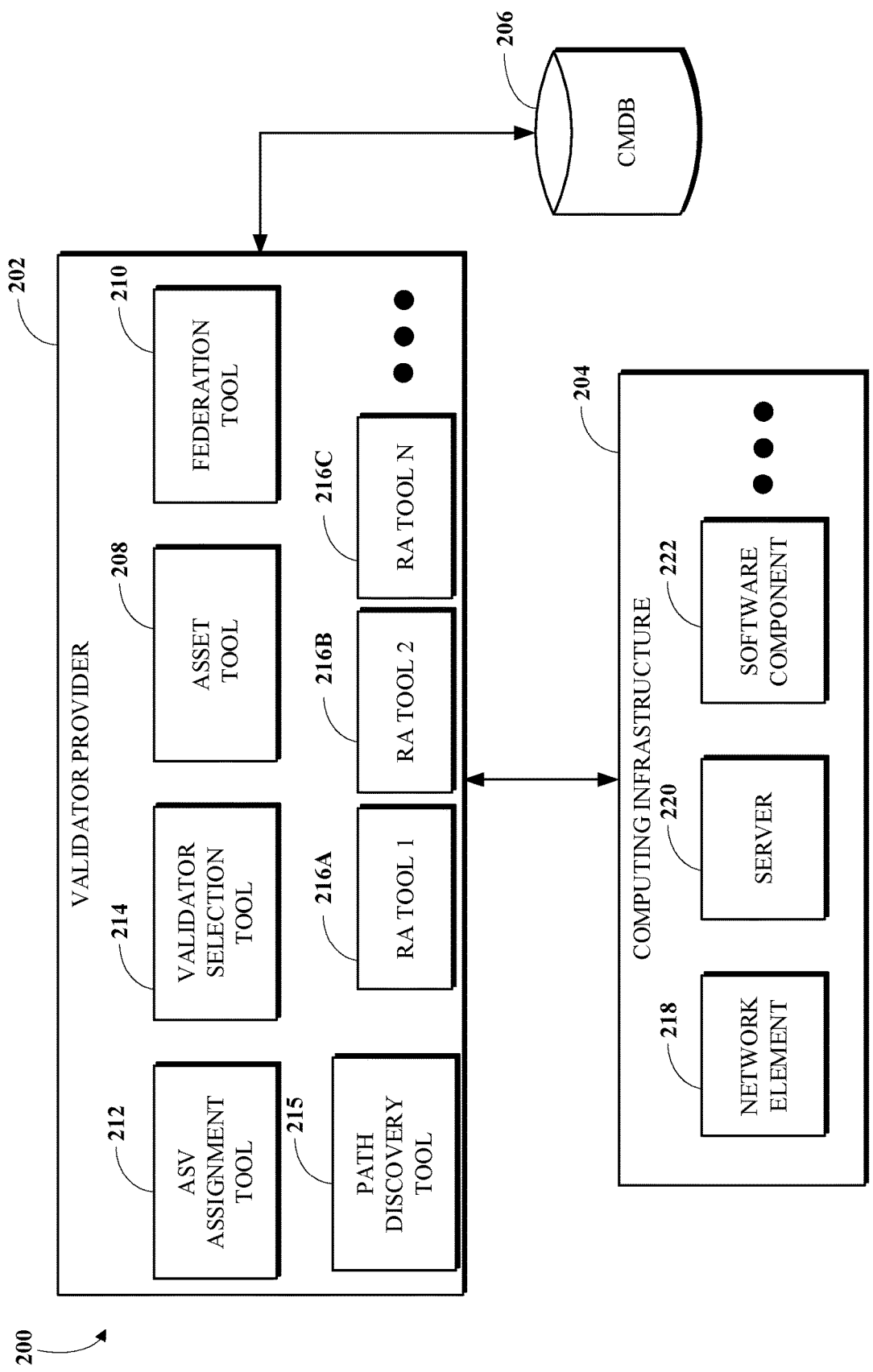
FIG. 2 is a block diagram 200 illustrating details of a validator provider.

FIG. 2 is a block diagram 200 illustrating details of a validator provider. The block diagram includes a validator provider 202, a computing infrastructure 204, and a CMDB 206. The validator provider 202 can be the validator provider system 106 of FIG. 1. The CMDB 206 can be the CMDB 110 of FIG. 1. The computing infrastructure 204 may be that of (e.g., managed by, owned by, operated by, etc.) an asset holder who may provide computing services. Examples of asset holders include a telecommunications provider and a cloud-based service provider. The computing infrastructure 204 is shown as including a network element 218 (e.g., a router, an optical transponder), a server 220 (e.g., a load balancer, a database server), and a software component (e.g., a conferencing software). However, in reality, the computing infrastructure 204 would include significantly more assets.

Figure 10:
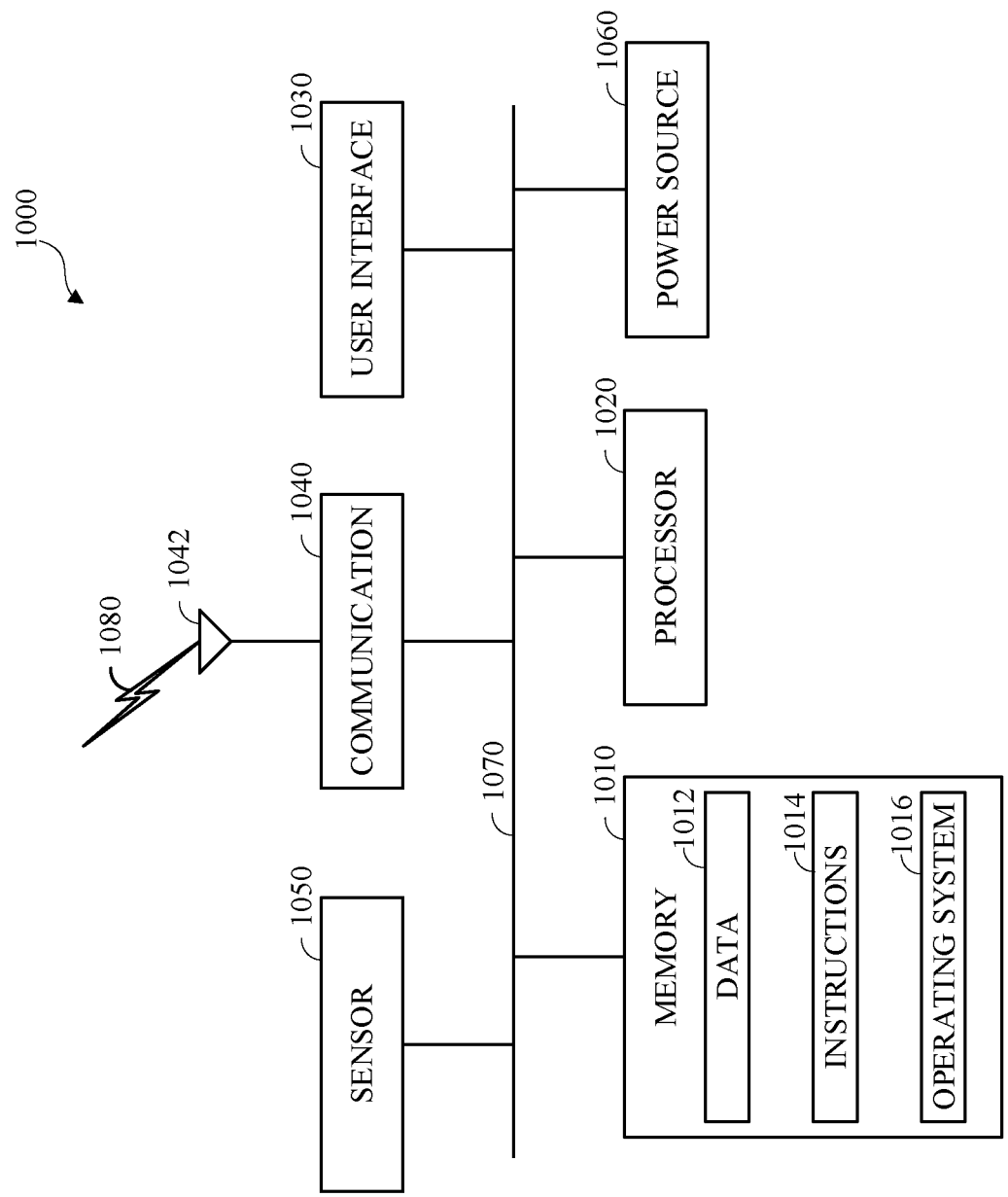
FIG. 10 is a diagram of a computing device 1000 in accordance with implementations of this disclosure.

The validator provider 202 can be implemented by one or more computing devices described with respect to FIG. 10. The validator provider 202 can include one or more tools for managing assets of the computing infrastructure 204. Managing assets of a computing infrastructure can include receiving and storing information about the computing assets; receiving requests (such as from users or other devices) to update configurations of at least some the computing assets and transmitting requests to the computing assets, or EMSs that manage such assets, to change the configurations. The validator provider 202 can include tools for associating ASVs with at least some of the computing assets; receiving requests from stakeholders to obtain validation stakes; assigning, based on the requests, validation stakes using the ASVs to the stakeholders. The validator provider 202 can include tools for receiving requests for validators of distributed ledger blocks and selecting, from the amongst the stakeholders, one or more validators (i.e., a stakeholder and/or a delegate validator of the stakeholder) according to their respective validation stakes.

The validator provider 202 is shown as including an asset tool 208, a federation tool 210, an ASV assignment tool 212, a validator selector tool 214, a path discovery tool 215, and resource adaptor tools 216A-216C. In some implementations, the validator provider 202 can include more or fewer tools. In some implementations, some of the tools may be combined, some of the tools may be split into more tools, or a combination thereof.

At least some of the tools can be implemented as respective software programs that may be executed by one or more computing devices, such as the computing device 1000 of FIG. 10. A software program can include machine-readable instructions that may be stored in a non-transitory computer storage medium, such as the memory 1010 of FIG. 10, and that, when executed by a processor, such as the processor 1020, may cause the computing device to perform the instructions of the software program. In some implementations, the validator selector tool 214 may be implemented separately form, but works in conjunction with (e.g., in communication with) the validator provider 202. In such implementations, the validator selector tool 214 may store data (including public keys) related to stakeholders and delegate validators in the CMDB 206 of some other data store. A person skilled in the art can readily appreciate that different configurations (e.g., arrangements, implementations, deployments) of the tools and data stores described with respect to FIG. 2 where the teachings described herein can be implemented are possible.

The asset tool 208 can receive or obtain data regarding assets of the computing infrastructure 204. The asset tool 208 can be used to store (e.g., create) or update CIs in the CMDB 206. The data regarding the assets can be received or obtained in any number of ways. The data can be received via user interfaces (not shown) of the validator provider 202. For example, a user using a client device may use an application, a web-browser, or the like to enter or update data regarding computing assets. For example, data regarding assets may be loaded in bulk (i.e., bulk loaded) into the CMDB 206 via the asset tool 208.

The asset tool 208 may obtain data regarding at least some of the assets using network discovery probes. For example, the asset tool 208 can include capabilities for discovering assets in the computing infrastructure 204. For example, the asset tool 208 may send a broadcast message over one or more networks of the computing infrastructure 204. At least some of the assets of the computing infrastructure 204 may respond to the broadcast therewith enabling the asset tool 208 to discover the assets.

At least some of the assets of the computing infrastructure 204 may provide services (e.g., Application Programming Interfaces (APIs)) for obtaining information (e.g., configuration information) from the assets. Each of the assets may have its own specific ways of obtaining such information. Thus, the validator provider 202 can include resource adapters that are configured or programmed to communicate with certain assets types or EMSs that include or can obtain data from computing assets. As such, resource adaptors can mediate to multi-vendor EMSs to obtain data regarding physical and logical computing assets. For example, each of the resource adapter tools 216A-216C may be configured to communicate with an asset type or EMS of the computing infrastructure 204. To illustrate, one of the resource adapters 216 may be configured to communicate with a particular device (i.e., a device of a certain model number) from a first vendor; one of the resource adapters 216 may be configured to communicate with all devices of a second vendor; and one of the resource adapters 216 may be configured to communicate with an EMS that is capable of communications with at least certain device types of a particular vendor.

To illustrate, and without limitations, one of the resource adapters 216 may be programmed to obtain data from and/or set data in a network element 218 that is an EMS. An EMS can include systems and applications for managing network elements on a network element-management layer (e.g., layer 3) of the Telecommunications Management Network model. The resource adapter (RA) may be configured with credential information, which may be stored in the CMDB 206 in association with a CI corresponding to the EMS. The RA may obtain physical connector details from the EMS, where a physical connector represents a connector capable of transmitting signals or power. The RA may obtain, from the EMS, node types of optical devices. The RA may obtain, from the EMS, equipment details, where each equipment object obtained contains respective attributes and contains a list of Fully Distinguished Names (FDNs) of the equipment instances contained within it. The RA may obtain, from the EMS, data regarding all nodes, equipment, and/or virtual connections configured by, managed by or known to the EMS. Many other options are possible.

Subsets and redundant data regarding assets of the computing infrastructure 204 may exist in many Operational Support Systems (OSSs), including EMSs. The federation tool 210 can be used to obtain (such as by querying) data from many OSSs to present a single view for users (e.g., operations engineers, support staff). The OSSs can include one or more of service ordering systems, network planning systems, troubleshooting systems, contract management systems, customer portal systems, physical inventory system, other types of systems, or a combination thereof. In an example, the federation tool 210 can synchronize (e.g., unify, integrate) information obtained from the resource adapters 216, such as information regarding network physical and/or logical computing assets, with the stakeholders and validators pool data (described below) into a single unified model.

Figure 3:
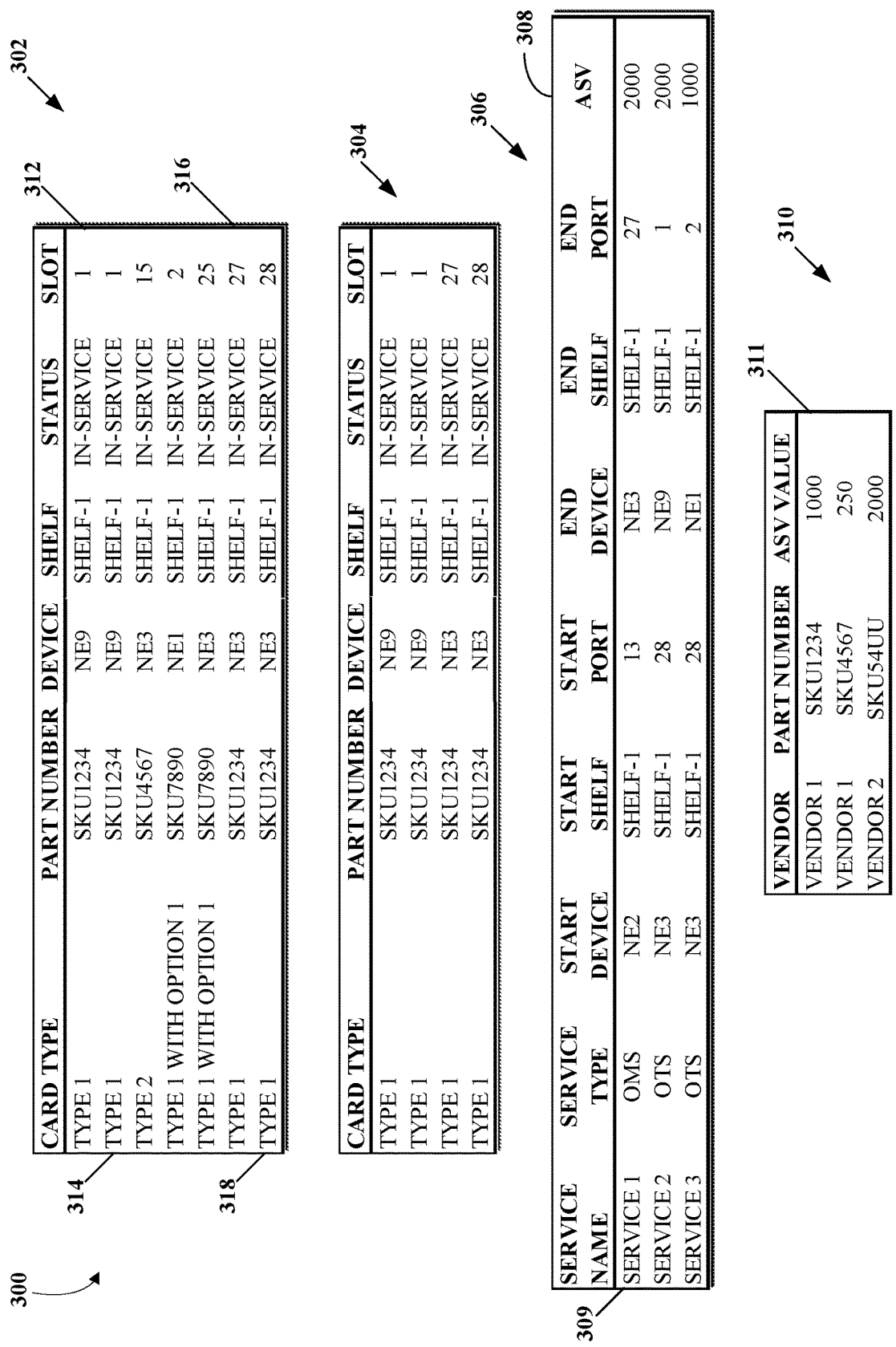
FIG. 3 illustrates examples of data stored in or obtained from the configuration management database of FIG. 2.

FIG. 3 illustrates examples 300 of data stored in or obtained from the CMDB 206 of FIG. 2. The examples 300 illustrate a physical and logical inventory view of CIs of the CMDB 206. A table 302 illustrates results of a query of the CMDB 206 for network cards of a certain type (i.e., a type that encompasses the part identifiers SKU1234, SKU4567, and SKU7890, which may also be referred as Product Equipment Codes (PECs)). The table 302 illustrates that a row can at least partially represent information regarding a network element, such as the network element 218 of FIG. 2 and/or, conversely, information regarding another device that is included in the network element. The table 302 illustrates that a network element (e.g., NE3) may be made up of shelves (e.g., SHELF-1) and that each shelf can have multiple slots (e.g., SLOTS 25, 27, and 28) and that devices (e.g., network interfaces) of different types and model numbers may be available (e.g., inserted into) those slots. A table 304 illustrates results of query of the CMDB 206 for all nodes, shelves, and slots which have a computing asset that has the part number SKU1234.

A table 306 illustrates results of query of the CMDB 206 for all services that have nodes, shelves, and slots with a part number of SKU1234. The table 306 illustrates that a service (e.g., SERVICE 1 of a row 309) starts from a port (e.g., START PORT 13) on a network card/interface having the part number of SKU1234, which is inserted into the slot (e.g., START PORT 13) and shelf (e.g., SHELF-1) of a network element (e.g., NE2) and ends on a port (e.g., END PORT 27) of another network element (e.g., NE3) in a network card inserted in a shelf (e.g., END SHELF SHELF-1). The ASV column 308 is explained below.

Returning again to FIG. 2, the ASV assignment tool 212 can be used to associate respective ASVs with at least some of the computing assets of the computing infrastructure 204. The ASVs can be associated with CIs corresponding to the assets in the CMDB 206. In an example, at least some of the ASVs may be entered via a user interface of the validator provider 202. In an example, and as further described herein, the ASV assignment tool 212 can process services (e.g., network services) in the logical assets stored in the CMDB 206 and assign ASVs to the services. The ASVs can be assigned to a service based on asset identifiers (e.g., PECs) used by the service.

Many different models can be available for associating ASVs with assets and the disclosure herein is not limited to any particular model. The ASVs may be associated with the assets based on relative values of the assets. Many different ways can be available for defining/setting the relative values. In an example, users (e.g., personnel of the asset holder) may determine and assign the relative ASVs. In an example, the ASVs may be associated with assets based on respective costs of (e.g., price paid for the assets). The cost data may be obtained from a procurement system. In an example, the ASVs may be associated with the assets based on revenues that the asset holder receives from the assets. In an example, the ASVs may be associated with the assets based on rental values that may be associated with rentable assets.

The computing infrastructure 204 may include several identical assets (e.g., multiples of a same device model from a same vendor). As such, the CMDB 206 can include several CIs corresponding to the same device type (e.g. model). In some examples, ASVs may be alternatively or additionally assigned to generic device models rather than the specific assets. The ASV associated with the specific asset can be obtained from (is the same as) the corresponding device model ASG. Returning to FIG. 3 again, a row 311 of a table 310 illustrates, for example, that an ASV of 1000 is associated with the model identifier SKU1234 of the vendor VENDOR1. As such, the ASV 1000 would be associated with each of the assets of rows 312-318 of the table 302 as these assets are instances of the device of the row 311.

The validator selector tool 214 can receive and perform (e.g., respond to) requests related to validators. The validator selector tool 214 can receive requests for validator registration, such as described with respect to FIGS. 5A-5B. In response to a request for a validator, the validator selector tool 214 can select from amongst the validators (stakeholders and/or delegate validators therefor, as the case may be) configured with or known to the validator selector tool 214 according to a prescribed set of validator selection rules. The validator selector tool 214 can rank the stakeholders based on their respective validation stakes, according to a ranking algorithm, and according pick a stakeholder (and delegate validators therefor). The requests can be received from the distributed transaction system, as described with respect to FIG. 7. The validator selector tool 214 can receive requests to reward the stakeholder. The validator selector tool 214 can receive requests to decrease the validation stake of a stakeholder, such as described with respect to FIG. 8.

The path discovery tool 215 is capable of computing suitable paths between end points of the computing infrastructure 204. The path discovery tool 215 can be used to interrogate the computing infrastructure 204 and discover computing assets that constitute a service. The path discovery tool 215 may create or cause to be created one or more CIs in the CMDB 206 corresponding to the service. The path discovery tool 215 can operate at different layers of the Open Systems Interconnection (OSI) network model. For example, the path discovery tool 215 can operate at one of the layers 7, 6, or 5 (respectively, the application layer, the presentation layer, or the session layer) to, given a starting point of a service can identify a path that includes all assets (e.g., software and hardware assets) that are used to provide the service. In an example, the path discovery tool 215 can operate at the layer-3 level (i.e., the network layer) of the OSI model. For example, given a service, the path discovery tool 215 may drill down into the network of the computing infrastructure 204, which may include or may be managed by multi-vendor network management systems or software-defined networking (SDN) controllers, to identify the computing assets that the packets of the service pass through. For example, given the assets described with respect to FIG. 3, the path discovery tool 215 may receive a request to identify a path between a first end point A and a second end point B that includes at least one or more of the following inventory: (NE9, SHELF-1, SLOT 1), (NE2, SHELF-1, SLOT 13), (NE3, SHELF-1, SLOT 27), and (NE3, SHELF-1, SLOT 28). In response to the request, the path discovery tool 215 may identify the services of the table 306 of FIG. 3. As already described, the table 306 is obtained from the CMDB 206. The table 306 may be created in the CMDB 206 as a result of the described request to the path discovery tool 215.

Figure 4:
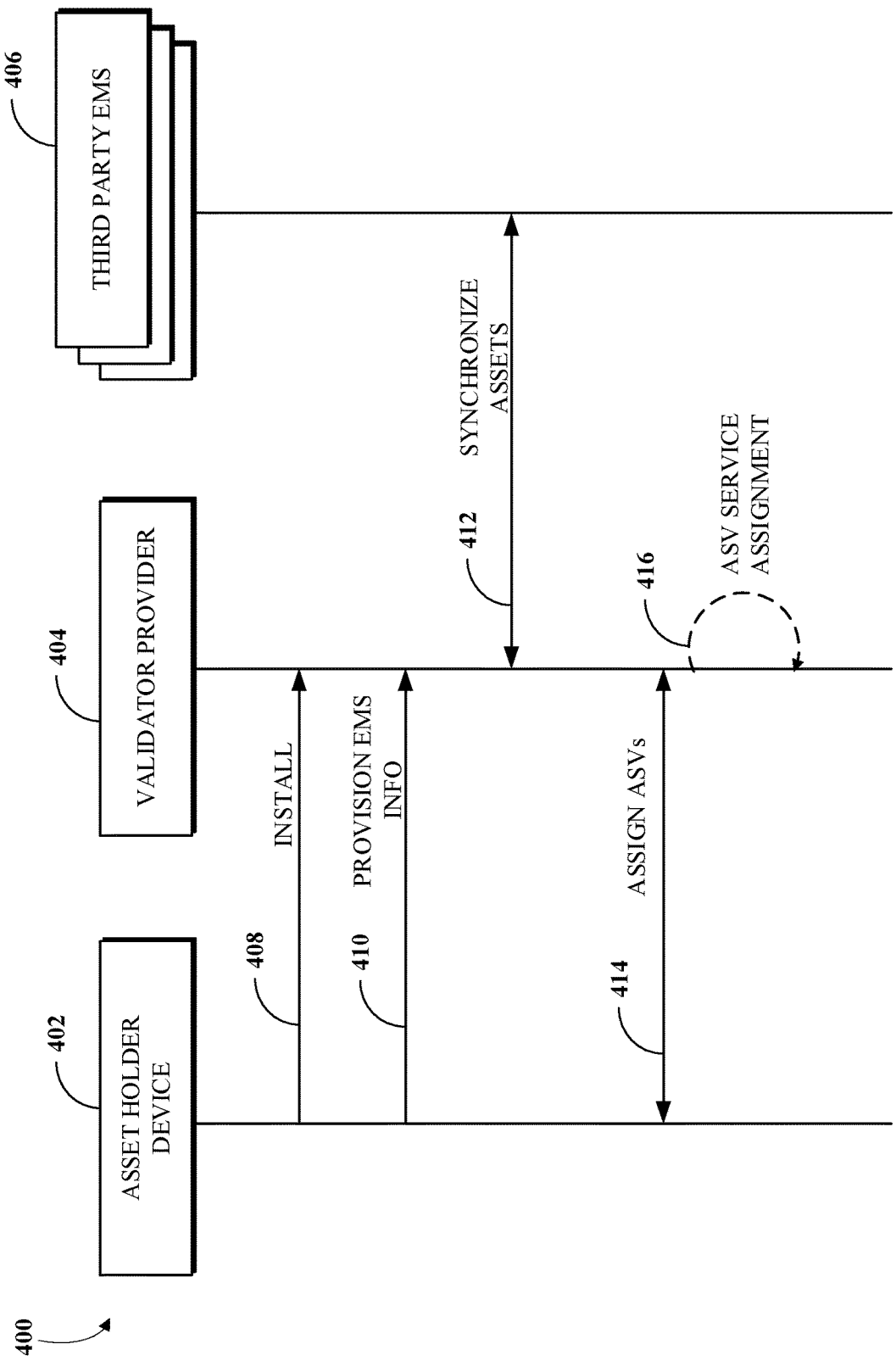
FIG. 4 is an example of an interaction diagram of an initial set up of a validator provider.

FIG. 4 is an example of an interaction diagram 400 of a initial set up of a validator provider. The interaction diagram 400 includes an asset holder device 402, a validator provider 404, and one or more EMS systems 406. The asset holder device 402 can be a computing device 10 of FIG. 10. The asset holder device 402 can be used by a user (e.g., an administrator of an asset holder entity, which may be a service provider) to install, at 408, the validator provider 404, which can be the validator provider system 106 of FIG. 1 or the validator provider 202 of FIG. 2. At 410, the user can use the asset holder device 402 to provision the validator provider 404 with EMS-related information. For example, the validator provider 404 may receive requests from the asset holder device 402 to configure the one or more EMS systems 406, such as in the CMDB 206 of FIG. 2. Configuring the one or more EMS systems 406 can include providing respective Internet Protocol (IP) addresses and credential information for accessing (e.g., issuing requests, interrogating, making calls to) the one or more EMS systems 406. More broadly, the EMS systems 406 can be or include computing infrastructure management, probing, discovery tools, software, or systems.

At 412, the validator provider 404 can issue requests to the one or more EMS systems 406, via respective RAs, such as one or more of the resource adapters 216 of FIG. 2, to obtain respective information from the one or more EMS systems 406 regrading computing assets managed by or known to the one or more EMS systems 406. The validator provider 404 can create and store CIs corresponding to the assets in the CMDB 206 of FIG. 2.

At 414, the validator provider 404 may receive requests to assign ASVs to at least some of the assets stored in the CMDB 206. At least some of the ASVs may be provided by a user using the asset holder device 402. For example, the validator provider 404 may provide user interfaces (e.g., graphical user interfaces, command line tools, bulk loading tools) accessible using the asset holder device 402 to provide the ASVs. The validator provider 404 may receive a request to assign an ASV to an asset. Assigning an ASV to an asset encompasses assigning the ASV to a product type so that all computing assets of that product type are also assigned (e.g., inherit) the ASV assigned to the product type. The request can include an asset identifier (e.g., a PEC code, a SKU, a product code, a serial number, a product name, or some other identifier of an asset or asset type) and a corresponding ASV. The validator provider 404 can associate the ASV with the asset identifier in the CMDB 206.

In an example, the validator provider 404 may be configured to assign ASVs according to preconfigured instructions. For example, the validator provider 404 may be configured to assign relative ASVs to assets according to respective values associated with assets. As described above, the respective values associated with assets can be cost, revenue, rental, some other value, or a combination thereof. A function that receives an asset value and outputs an ASV may be used. The function can be a linear function, a linear threshold function (such that a minimum/maximum ASV is assigned to an asset identifier where if the asset value is below/above a minimum/maximum threshold), or some other function. Table 310 of FIG. 3 illustrates an example of ASVs assigned to asset types (i.e., asset identifiers).

In some implementations, the validator provider 404 may, at 416, assign ASVs to services. For example, the path discovery tool 215 of FIG. 2 may be used to identify computing assets used by a service. The ASV assigned to the service can be the sum of the respective ASVs of the identified computing assets. As described herein, the ASVs can be assigned based on the asset identifiers of the computing assets.

The computing infrastructure 204 can change often: new computing assets may be added, removed, re-configured, and the like. As such, the validator provider 404 can obtain current computing assets, according to a schedule, from the computing infrastructure 204. The schedule can be daily, hourly, or some other preconfigured frequency. The ASV assignment tool 212 of FIG. 2 can use the list of current computing assets to update the asset ASVs in the CMDB 206. For example, if new assets are discovered, then ASVs can be assigned to the new discovered assets.

Figure 5A:
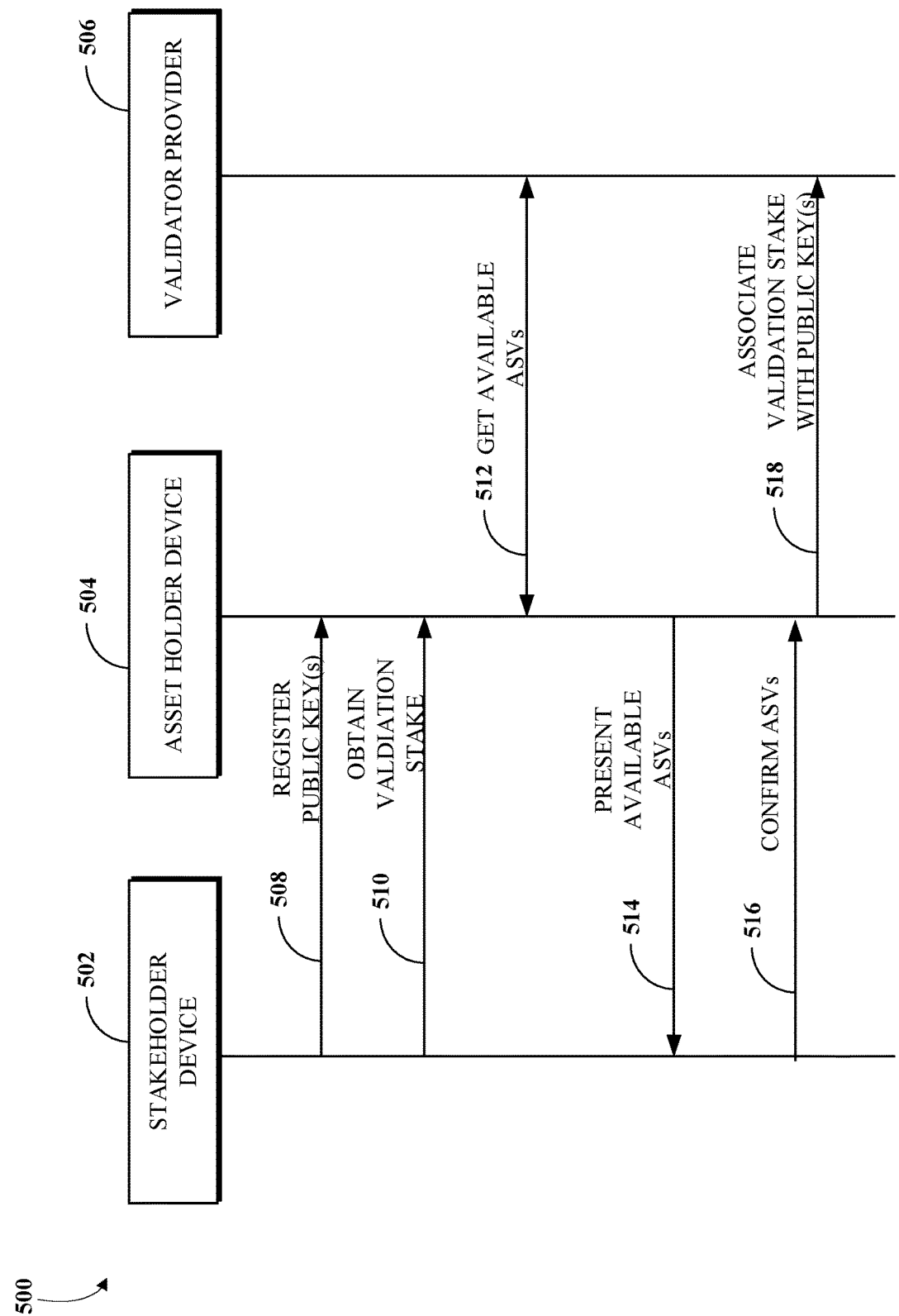
FIG. 5A is an example of an interaction diagram of an initial validator registration.

FIG. 5A is an example of an interaction diagram 500 of an initial validator registration. The interaction diagram 500 can be performed to register a new node (and/or multiple delegate validator nodes) of a stakeholder as validator(s) for blocks of a distributed ledger. The interaction diagram 500 includes a stakeholder device 502, an asset holder device 504, and a validator provider 506. In some implementations, the asset holder device 504 and the validator provider 506 may be or may be both implemented by the validator provider 506.

At 508, via the stakeholder device 502 (e.g., via a user interface accessible using the stakeholder device 502), a user of the stakeholder may transmit a request to register a node of the stakeholder as a validator. A node of the stakeholder can be a computing device (e.g., a server) that is managed by and/or is under the control of personnel of the stakeholder. The request may include information related to the node that can be used by the validator provider 506, the distributed transaction system, or other computing devices to communicate with the node.

The request also includes at least one public cryptographic key to associate with the node. As already mentioned, a validator uses its private key to sign (e.g., hash) a block of transactions. Other nodes use the public key of the validator to validate the digital signature of the validator. Thus, the validator provider 506 can be used as a clearinghouse (e.g., a repository) of public keys of validators. In an example, the validator selector tool 214 of FIG. 2 can store the public keys in a permanent store (e.g., a keystore). Other information may be included in the request.

As mentioned above, the roles of staking and the role block validation can be separated. As such, a stakeholder can delegate block validation to a delegate validator. A stakeholder can have several delegate validators. As such, the request can include the respective public keys of the delegate validators (i.e., the respective public keys associated with delegate validators).

At 510, a request to obtain a validation stake may be received from the stakeholder device 502. The request may be received at the asset holder device 504. In an example, the request may be received directly at the validator provider 506. The request can include an indication of a total ASV to be assigned as the validation stake to the stakeholder. The request to obtain the stake can be a request to purchase and pay for the stake. While not specifically shown in FIG. 5A, the interaction diagram 500 may include additional steps for completing a transaction whereby the stakeholder pays (such as using a traditional or a crypto currency) for the obtained validation stake.

In an example of 512, the asset holder device 504 can identify, or can issue a request to the validator provider 506 to identify, assets the combined ASV of which total the certain value. The identified assets and the validation stake value are then assigned to the stakeholder. In an example, only assets that are not already assigned to stakeholders are identified. In another example, assets can be assigned to more than one stakeholder. In an example, at 514, the assets can be presented (such as via a user interface) at the stakeholder device 502. At 516, the user of the stakeholder device 502 can identify (select) the assets to be assigned to the stakeholder.

In another example of 512, and in response to the request at 510, services (instead of individual computing assets) may be identified. In an example, only services that are not already assigned to stakeholders can be identified. In another example, services can be assigned to more than one stakeholder. For example, the validator provider 506 may identify services having ASVs not greater than the certain stake value. To illustrate using the services of the table 306 of FIG. 3, if the certain stake value requested is 3000, the services SERVICE1, SERVICE2, and SERVICE3 with the respective ASVs 2000, 2000, and 1000 may be identified. In another example of 512, both individual assets and services may be identified.

At 514, the identified services are presented at the stakeholder device 502. At 516, services or computing assets, as the case may be, selected by the user of the stakeholder device 502 are transmitted to the asset holder device 504. For example, the user may select SERVICE1 and SERVICE3 (totaling an ASV of 3000). At 518, the selected computing assets and/or services, as the case may be, are assigned to the stakeholder, such as in a data store accessible to the validator provider 506. In an example, the data store can be the CMDB 206 of FIG. 2.

Figure 5B:
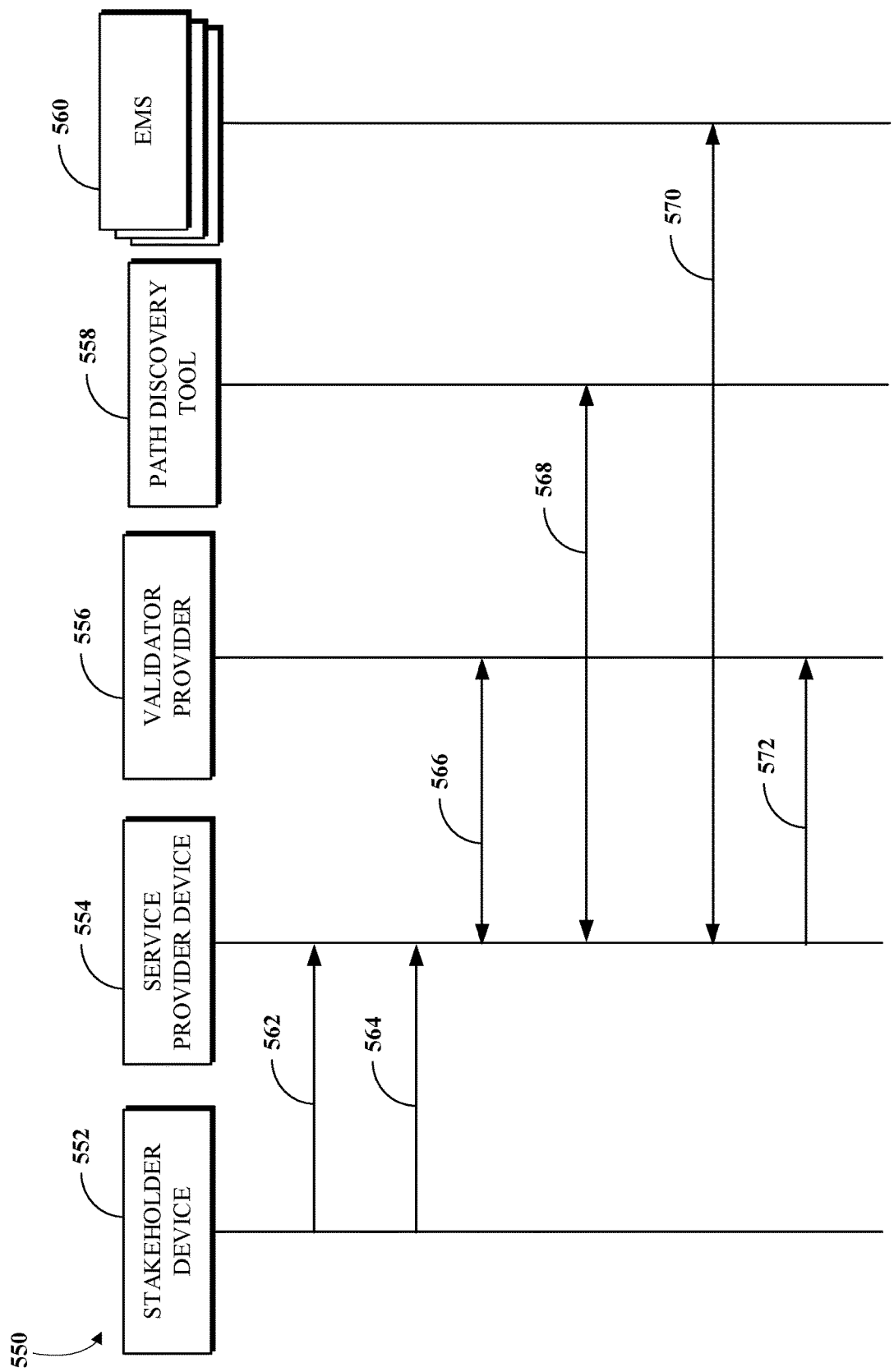
FIG. 5B is another example of an interaction diagram of an initial validator registration.

FIG. 5B is another example of an interaction diagram 550 of an initial validator registration. Whereas the interaction diagram 500 illustrates assigning stakes to stakeholder based on existing services and/or computing devices, which may or may not be used by a stakeholder, the interaction diagram 550 illustrates an example where the stakeholder requesting a validation stake must acquire a service from the service provider (therewith becoming a user of the service) in order to acquire a validation stake from the service provider based on the service. This scenario may be referred to as "acquiring a stake by provisioning."

The interaction diagram 550 includes a stakeholder device 552 (which can be similar to the stakeholder device 502 of FIG. 5A), a service provider device 554 (which can be similar to the asset holder device 504 of FIG. 5A), a validator provider 556 (which can be similar to the validator provider 506 of FIG. 5A), a path discovery tool 558 (which can be the path discovery tool 215 of FIG. 2), and one or more EMSs 560.

At 562, which can be as described with respect to 508 of FIG. 5A, a request to register a node of the stakeholder as a validator. At 564, a request to acquire (i.e., become a user/consumer of, purchase, rent, lease, subscribe to) a service is received from the stakeholder device 552 at the service provider device 554. In an example, a list of services may be presented in a user interface to a user of the stakeholder device 552 and the user selects the service(s) to acquire. At 566, the service provider device 554 obtains a list of available assets that are not currently in-service or assigned to other services. The list of available assets can be obtained from the validator provider 202 of FIG. 2, which may manage the available assets in the CMDB 206.

At 568, the service provider device 554 may issue a request to the path discovery tool 558 to obtain a path. In some examples, the request to the path discovery tool 558 can include constraints on the path(s) to be obtained (e.g., identified) by the path discovery tool 558. For example, the request can include constraints regarding specific computing assets to be included or excluded when obtaining path(s). To illustrate, a request may indicate that the obtained path(s) must include (e.g., pass through, use) the network elements NE2 and NE3. Other constraints (e.g., search criteria) are possible. At 570, the assets are provisioned. For example, requests may be issued to the respective EMSs of the identified assets to provision the assets. At 572, the sum of the ASVs of the computing assets used to provision the service are assigned to the stakeholder as the validation stake of the stakeholder.

In another example of assigning stake to a stakeholder, combinations of device, shelf, slot, PEC and serial numbers can be digitally signed by the validator provider 556 therewith attesting that the inventory collected has not been tampered with. The stakeholder can be assigned the ASV of an asset only if the stakeholder is a user of (i.e., has acquired) a service that uses the combination.

Figure 6:
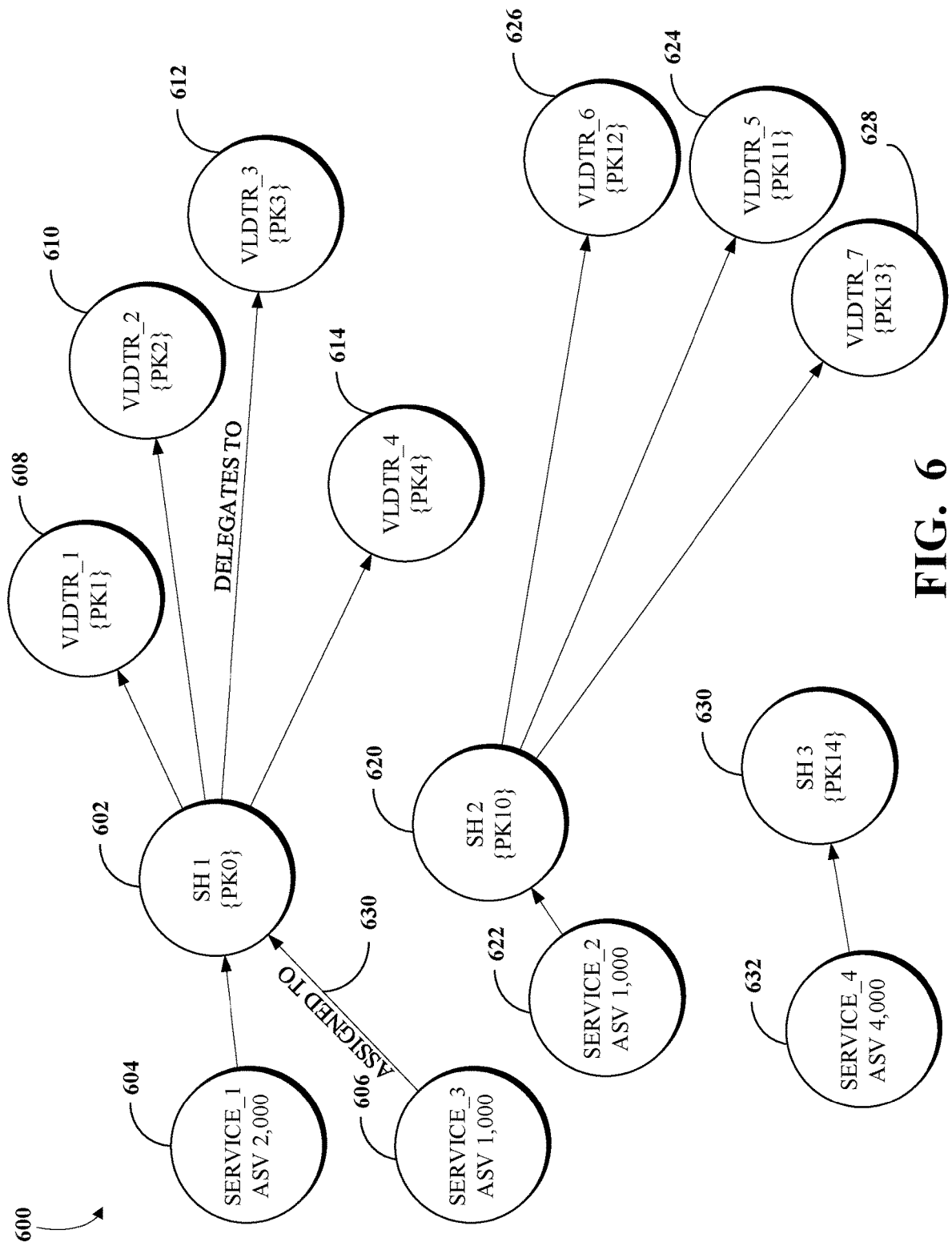
FIG. 6 is a graph that illustrates relationships of a stakeholders and validators pool that may be created by a validator provider.

FIG. 6 is a graph 600 that illustrates relationships of a stakeholders and validators pool that may be created and maintained (e.g. managed, modified) by a validator provider. The pool includes stakeholders, validators, their respective public keys (of the public/private keys used for encryption), and relationships therebetween. The illustrated relationships may be stored using any suitable techniques. In an example, the relationships may be stored in a graph database as labeled nodes and labeled relationships. The graph 600 includes graph nodes (circles) representing service objects (which may be or may be indicative of CIs of services), stakeholder objects (which are representative of stakeholders), and validator objects (which are representative of computing devices that serve as delegate validators). The relationship between a service object and a stakeholder object may be labeled "ASSIGNED TO" and may have an associated timestamp to indicate the time that the service was assigned to the stakeholder. The relationship between a stakeholder object and a validator object may be labeled "DELEGATES TO."

The graph 600 illustrates that a stakeholder 602, representing a stakeholder who requested a validation stake of 3,000, is assigned services 604 and 606, which have a combined ASV of 3,000. The stakeholder 602 is configured to have four delegate validators; namely, validators 608-614. The graph 600 also illustrates that a stakeholder 620, representing a stakeholder who requested a validation stake of 1,000, is assigned a service 622, which has an ASV of 1,000. The stakeholder 620 is configured to have three delegate validators; namely, validators 624-628. The graph 600 also illustrates that a stakeholder 630, representing a stakeholder who requested a stake of 4,000, is assigned a service 632, which has an ASV of 4,000. No delegate validators are associated with the stakeholder 630. As such, the computing device indicated by the stakeholder 630 can itself be a validator. Public keys PK0, PK1, PK2, PK3, PK4, PK10, PK11, PK12, PK12, PK13, and PK14 may be stored in the respective nodes, as shown in FIG. 6.

FIG. 7 is a flowchart of an example of a technique 700 for validator selection. The technique 700 can be implemented, for example, as a software program that may be executed by computing devices such as, the computing device 1000 of FIG. 10, the validator provider system 106 of FIG. 1, or the validator provider 202 of FIG. 2. The software program can include machine-readable instructions that may be stored in a memory such as the memory 1010, and that, when executed by a processor, such as processor 1020, may cause the computing device to perform the technique 700. The technique 700 may be implemented at least partially by the validator selector tool 214 of FIG. 2. The technique 700 can be implemented using specialized hardware or firmware. Multiple processors, memories, or both, may be used.

At 702, a request for a validator is received. The request can be received from a distributed transaction system, such as the distributed transactions platform 102 of FIG. 1. As mentioned, the distributed transaction system can be a blockchain system. In an example, the request for a validator may be received at an asset holder device. The asset holder device can transmit the request to the validator provider device. In some implementations, the asset holder device and the validator provider can be a same device. In some implementations, the asset holder and the validator provider can be a same entity. In some implementations, the asset holder and the validator provider can be different entities.

At 704, the validator provider selects a validator from a validator pool, which can be as described above with respect to FIG. 6. The validator provider can retrieve the stakeholders according to a ranking algorithm. In an example, the ranking algorithm can rank the stakeholders according to a linear relationship to the respective validation stakes of the stakeholders. That is, the size of the validation stake determines the chances of a stakeholder to be chosen to forge (i.e., validate and add) the next block of the chain. To illustrate, if a first stakeholder has a validation stake of 100 and a second stakeholder has a validation stake of 1000, then the second stakeholder has a 10 times higher chance of being chosen to forge the next block.

In an example, the ranking algorithm can rank the stakeholders, such as in descending order of the stakes taking into account the timestamps that the stakes were assigned to the stakeholders. As such, the ranking algorithm can select the stakeholder having the highest stake and having been a stakeholder for the longest duration. Table I illustrates that a STAKEHOLDER 1 obtained 100 validation stakes 1 month ago and another 50 validation stakes 3 days ago; and STAKEHOLDER 2 obtained 100 validation stakes 1 month ago and another 50 validation stakes 2 days ago. As such, both STAKEHOLDER 1 and STAKEHOLDER 2 each has 150 validation stakes in total. However, the raking algorithm may rank (or may be skewed toward ranking) STAKEHOLDER 1 since it is holding a validation stake that is older than the validation stake of STAKEHOLDER 2. Other ways of selecting stakeholders are possible.

TABLE I

| STAKEHOLDER 1 | STAKEHOLDER 2 |
| --- | --- |
| 100 STAKE - 1 MONTH | 100 STAKE - 1 MONTH |
| 50 STAKE - 3 DAYS | 50 STAKE - 2 DAYS |

At 706, the public keys of the selected stakeholder and all of its delegate validators (if any) are transmitted to the requestor (e.g., the distributed transaction system). The requestor (e.g., the distributed transaction system) can select one of the validators, based on its public key, to transmit the block to for validation. The distributed ledger system can use the public key to ensure that only a legitimate validator (i.e., a validator with a corresponding private key) can access the block by encrypting the block with the public key. To illustrate, and with reference to FIG. 6, if stakeholder 3 is selected, then the public key PK14 is transmitted to the requester; and if stakeholder 602 is selected, then the public keys PK0, PK1, PK2, PK3, and PK4 are transmitted to the requester.

FIG. 8 is a flowchart of an example of a technique 800 for reducing the stake of a stakeholder. The technique 800 can be used to penalize (e.g., reduce) the validation stake of a stakeholder if a delegate validator of the stakeholder, or the stakeholder itself, is determined to have created conflicting or invalid blocks in the distributed ledger. For example, the distributed transaction system (i.e., other nodes of distributed transaction system based on a consensus protocol) may determine that the stakeholder or a validator therefor attempted to modify a transaction within the block.

The technique 800 can be implemented, for example, as a software program that may be executed by computing devices such as, the computing device 1000 of FIG. 10, the validator provider system 106 of FIG. 1, or the validator provider 202 of FIG. 2. The software program can include machine-readable instructions that may be stored in a memory such as the memory 1010, and that, when executed by a processor, such as processor 1020, may cause the computing device to perform the technique 800. The technique 800 may be implemented at least partially by the validator selector tool 214 of FIG. 2. The technique 800 can be implemented using specialized hardware or firmware. Multiple processors, memories, or both, may be used At 802, a request is received to reduce the stake of a stakeholder. The request can include the public key of the stakeholder and the amount by which to reduce the validation stake of the stakeholder. The request can be received from a distributed transaction system, such as the distributed transactions platform 102 of FIG. 1. As mentioned, the distributed transaction system can be a blockchain system. The request can be received by a validator provider. The request can be received by a validator selector tool of the validator provider.

At 804, the validator provider can identify the stakeholder based on the public key received in the request. The public key may be that of a stakeholder. Thus, a stakeholder associated with the public key can be searched for in the stakeholders and validators pool. The public key may be that of a delegate validator. Thus, a delegate validator associated with the public key can also be searched for in the stakeholders and validators pool. If a delegate validator is found, then the stakeholder associated with the delegate validator is identified.

At 806, the validation stake of the identified validator is reduced by the amount received in the request. Reducing the stake of the stakeholder can mean severing one or more associations between the stakeholder node and one or more computing assets or services corresponding to the amount. To illustrate and referring to FIG. 6, assume that the request is to reduce the stake of the stakeholder having (or associated with) the public key PK3. The technique 800 may identify a node labeled (e.g., is of type) "VALIDATOR" that includes or is associated with the public key PK3 therewith identifying the validator 612. The relationships "DELEGATES TO" can be used to find a node labeled "STAKEHOLDER" that is associated with the identified validator node therewith identifying the stakeholder 602. This node and relationship "ASSIGNED TO" can be used to find all the labeled nodes "SERVICE" associated with the stakeholder therewith identifying the services 604 and 606. The technique 800 can then identify the most appropriate service node matching the amount 1000. In this case the service 606 (i.e., SERVICE_3) is identified. The relationship between the stakeholder 602 and the service 606 can then be severed (i.e., the association is removed).

Figure 9:
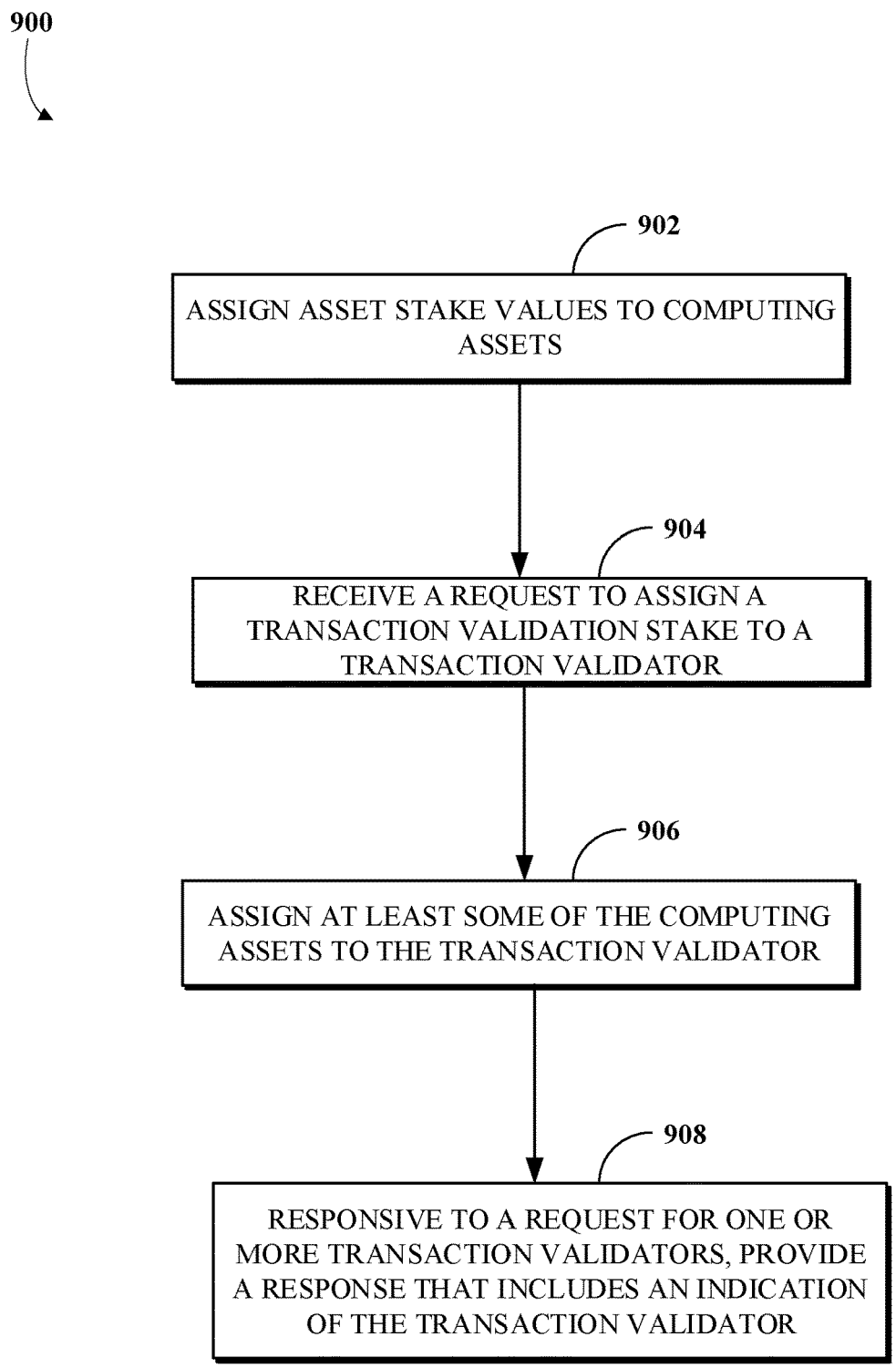
FIG. 9 is an example of a flowchart of a technique 900 for transaction validation.

FIG. 9 is an example of a flowchart of a technique 900 for transaction validation. The technique 900 can be implemented, for example, as a software program that may be executed by computing devices such as, the computing device 1000 of FIG. 10, the validator provider system 106 of FIG. 1, or the validator provider 202 of FIG. 2. The software program can include machine-readable instructions that may be stored in a memory such as the memory 1010, and that, when executed by a processor, such as processor 1020, may cause the computing device to perform the technique 900. The technique 900 may be implemented at least partially by the validator selector tool 214 of FIG. 2. The technique 900 can be implemented using specialized hardware or firmware. Multiple processors, memories, or both, may be used.

At 902, respective asset stake values (ASVs) are assigned to computing assets. The ASVs can be assigned as described above. The computing assets may be computing assets of respective network services. At 904, a request to assign a transaction validation stake to a transaction validator (e.g., a stakeholder) is received. The request can be as described with respect to one of FIGS. 5A-5B. At 906, at least some of the computing assets are assigned to the transaction validator, as described above. In an example, assigning the at least some of the computing assets to the transaction validator can include identifying a subset of the computing assets that are used by the transaction validator, wherein the subset of the computing assets includes the at least some of the computing assets. In an example, assigning the at least some of the computing assets to the transaction validator can include identifying a subset of the computing assets based on a network service that that is used by the transaction validator, where the subset of the computing assets includes the at least some of the computing assets.

At 908, responsive to a request for one or more transaction validators, a response that includes an indication of the transaction validator is provided to the requester. The transaction validator can be selected using the respective asset stake values of the at least some of the computing assets that are assigned to the transaction validator. The respective asset stake values of the at least some of the computing assets that are assigned to the transaction validator are or are indicative of the validation stake of the transaction validator. The indication of the transaction validator can be or include a public key of the transaction validator.

In an example, and as described above, assigning the respective asset stake values to the computing assets of network services can include assigning at least some of the respective asset stake values to at least some of the computing assets of the network services based on respective costs of the at least some of the computing assets. In an example, assigning the at least some of the computing assets to the transaction validator can include setting the transaction validation stake of the transaction validator to a sum of respective asset stake values of the at least some of the computing assets, as described above. In an example, the technique 900 can further include receiving a request to reduce the transaction validation stake of the transaction validator by a given value. The transaction validation stake can then be reduced by the given value, as described above.

In an example, the technique 900 can include receiving a public key and associating the public key with the transaction validator. The public key can be used, such by a distributed transaction system, to identify the transaction validator so that the distributed transaction system can transmit a block to the transaction validator for validation.

FIG. 10 is a diagram of a computing device 1000 in accordance with implementations of this disclosure. The computing device 1000 shown includes a memory 1010, a processor 1020, a user interface (UI) 1030, an electronic communication unit 1040, a sensor 1050, a power source 1060, and a bus 1070. As used herein, the term "computing device" includes any unit, or a combination of units, capable of performing any method, or any portion or portions thereof, disclosed herein.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 1000 can be integrated into any number of separate physical units. For example, the UI 1030 and processor 1020 can be integrated in a first physical unit and the memory 1010 can be integrated in a second physical unit.

The memory 1010 can include any non-transitory computer-usable or computer-readable medium, such as any tangible device that can, for example, contain, store, communicate, or transport data 1012, instructions 1014, an operating system 1016, or any information associated therewith, for use by or in connection with other components of the computing device 1000. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 1010 may include multiple physical units, such as one or more primary memory units, such as random-access memory units, one or more secondary data storage units, such as disks, or a combination thereof. For example, the data 1012, or a portion thereof, the instructions 1014, or a portion thereof, or both, may be stored in a secondary storage unit and may be loaded or otherwise transferred to a primary storage unit in conjunction with processing the respective data 1012, executing the respective instructions 1014, or both. In some implementations, the memory 1010, or a portion thereof, may be removable memory.

The data 1012 can include information, such as private keys or public keys. The instructions 1014 can include directions, such as code, for performing any technique, or any portion or portions thereof, disclosed herein. The instructions 1014 can be realized in hardware, software, or any combination thereof. For example, the instructions 1014 may be implemented as information stored in the memory 1010, such as a computer program, that may be executed by the processor 1020 to perform any of the respective techniques, algorithms, aspects, or combinations thereof, as described herein.

Although shown as included in the memory 1010, in some implementations, the instructions 1014, or a portion thereof, may be implemented as a special purpose processor, or circuitry, that can include specialized hardware for carrying out any of the methods, algorithms, aspects, or combinations thereof, as described herein, such as instructions for assigning ASVs to computing assets, instructions for validator selection, or any other instructions associated with or related to proof of asset value for transaction validator election. Portions of the instructions 1014 can be distributed across multiple processors on the same machine or different machines or across a network such as a local area network, a wide area network, the Internet, or a combination thereof.

The processor 1020 can include any device or system capable of manipulating or processing a digital signal or other electronic information now-existing or hereafter developed, including optical processors, quantum processors, molecular processors, or a combination thereof. For example, the processor 1020 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The UI 1030 can include any unit capable of interfacing with a user, such as a virtual or physical keypad, a touchpad, a display, a touch display, a speaker, a microphone, a video camera, a sensor, or any combination thereof. For example, the UI 1030 may be an audio-visual display device, and the computing device 1000 may present audio, such as decoded audio, using the UI 1030 audio-visual display device, such as in conjunction with displaying video, such as decoded video. Although shown as a single unit, the UI 1030 may include one or more physical units. For example, the UI 1030 may include an audio interface for performing audio communication with a user, and a touch display for performing visual and touch-based communication with the user.

The electronic communication unit 1040 can transmit, receive, or transmit and receive signals via a wired or wireless electronic communication medium 1080, such as a radio frequency (RF) communication medium, an ultraviolet (UV) communication medium, a visible light communication medium, a fiber optic communication medium, a wireline communication medium, or a combination thereof. For example, as shown, the electronic communication unit 1040 is operatively connected to an electronic communication interface 1042, such as an antenna, configured to communicate via wireless signals.

Although the electronic communication interface 1042 is shown as a wireless antenna in FIG. 10, the electronic communication interface 1042 can be a wireless antenna, as shown, a wired communication port, such as an Ethernet port, an infrared port, a serial port, or any other wired or wireless unit capable of interfacing with a wired or wireless electronic communication medium 1080. Although FIG. 10 shows a single electronic communication unit 1040 and a single electronic communication interface 1042, any number of electronic communication units and any number of electronic communication interfaces can be used.

The sensor 1050 may include, for example, an audio-sensing device, a visible light-sensing device, a motion sensing device, or a combination thereof. For example, the sensor 1050 may include a sound-sensing device, such as a microphone, or any other sound-sensing device now existing or hereafter developed that can sense sounds in the proximity of the computing device 1000, such as speech or other utterances, made by a user operating the computing device 1000. In another example, the sensor 1050 may include a camera, or any other image-sensing device now existing or hereafter developed that can capture an image such as the image of a user operating the computing device. Although a single sensor 1050 is shown, the computing device 1000 may include a number of sensors 1050. For example, the computing device 1000 may include a first camera oriented in a first direction, such as with a field of view directed toward a user of the computing device 1000, and a second camera oriented in another direction, such as with a field of view directed away from the user of the computing device 1000.

The power source 1060 can be any suitable device for powering the computing device 1000. For example, the power source 1060 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 1000. Although a single power source 1060 is shown in FIG. 10, the computing device 1000 may include multiple power sources 1060, such as a battery and a wired external power source interface.

Although shown as separate units, the electronic communication unit 1040, the electronic communication interface 1042, the UI 1030, the power source 1060, or portions thereof, may be configured as a combined unit. For example, the electronic communication unit 1040, the electronic communication interface 1042, the UI 1030, and the power source 1060 may be implemented as a communications port capable of interfacing with an external display device, providing communications, power, or both.

One or more of the memory 1010, the processor 1020, the UI 1030, the electronic communication unit 1040, the sensor 1050, or the power source 1060, may be operatively coupled via a bus 1070. For example, the memory 1010, the processor 1020, the UI 1030, the electronic communication unit 1040, the sensor 1050, and the bus 1070 may receive power from the power source 1060 via the bus 1070. In another example, the memory 1010, the processor 1020, the UI 1030, the electronic communication unit 1040, the sensor 1050, the power source 1060, or a combination thereof, may communicate data, such as by sending and receiving electronic signals, via the bus 1070. Although a single bus 1070 is shown in FIG. 10, a computing device 1000 may include multiple buses.

Although not shown separately in FIG. 10, one or more of the processor 1020, the UI 1030, the electronic communication unit 1040, the sensor 1050, or the power source 1060 may include internal memory, such as an internal buffer or register. For example, the processor 1020 may include internal memory (not shown) and may read data 1012 from the memory 1010 into the internal memory (not shown) for processing.

Although shown as separate elements, the memory 1010, the processor 1020, the UI 1030, the electronic communication unit 1040, the sensor 1050, the power source 1060, and the bus 1070, or any combination thereof can be integrated in one or more electronic units, circuits, or chips.

The words "example" or "implementation" are used herein to mean serving as an example, instance, or illustration. Any aspect or design described herein as "example" or "implementation" not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method of transaction validation, comprising:
interrogating a computing infrastructure, by a path discovery tool, to discover computing assets associated with network services, wherein interrogating the computing infrastructure by the path discovery tool comprises:
communicating, by the path discovery tool, with the computing assets and Element Management Systems (EMSs) that manage respective network elements, via resource adapters programmed to interface with respective computing asset types and the EMSs, wherein a resource adaptor of the resource adapters performs operations comprising:
obtaining, from a configuration management database (CMDB), credential information associated with a configuration item (CI) that is representative of an EMS or a computing asset managed by an EMS, and
obtaining, using the credential information, data regarding a computing asset from the EMS based on a computing asset-specific protocol;
associating, based on the interrogating, the computing assets with the network services in the CMDB;
assigning, by an asset holder device, respective asset stake values to the computing assets;
receiving, by the asset holder device, a request to obtain a transaction validation stake from a transaction validator device of a transaction validator;
unifying, into a unified model, data regarding network, physical, and logical computing assets with stakeholder data and validators data, wherein the unifying utilizes at least one federation tool that synchronizes information from multiple Operational Support Systems (OSSs), including at least some of the EMSs, by querying the multiple OSSs to identify and associate the computing assets with respective network services and respective stakeholders, wherein the unified model facilitates identification of computing assets for assignment based on a subset of the network services used by the transaction validator by querying the CMDB;
assigning, by a validator provider device, at least some of the computing assets to the transaction validator, wherein the assigning by the validator provider device comprises:
identifying the computing assets based on a subset of the network services used by the transaction validator by querying the CMDB to identify the computing assets associated with the subset of the network services; and
responsive to a request for one or more transaction validators to perform a validation, providing, by the validator provider device, a response that includes an indication of the transaction validator, wherein the transaction validator is selected based on the transaction validation stake calculated by summing respective asset stake values associated with the computing assets.

2. The method of claim 1, wherein assigning the respective asset stake values to the computing assets comprises:
assigning at least some of the respective asset stake values to at least some of the computing assets based on respective costs of the at least some of the computing assets.

3. The method of claim 1, wherein assigning the at least some of the computing assets to the transaction validator further comprises:
setting the transaction validation stake of the transaction validator to a sum of respective asset stake values of the at least some of the computing assets.

4. The method of claim 3, further comprising:
receiving a request to reduce the transaction validation stake of the transaction validator by a given value; and
reducing the transaction validation stake by the given value.

5. The method of claim 1, further comprising:
receiving a public key; and
associating the public key with the transaction validator, wherein the public key is used to identify the transaction validator.

6. The method of claim 1, wherein assigning the at least some of the computing assets to the transaction validator further comprises:
identifying a subset of the computing assets that are used by the transaction validator, wherein the subset of the computing assets includes the at least some of the computing assets.

7. A system, comprising:
one or more memories; and
one or more processors, the one or more processors configured to execute instructions stored in the one or more memories to:
interrogate a computing infrastructure, by a path discovery tool, to discover computing assets associated with network services, wherein to interrogate the computing infrastructure by the path discovery tool comprises to:
communicate, by the path discovery tool, with the computing assets and Element Management Systems (EMSs) that manage respective network elements, via resource adapters programmed to interface with respective computing asset types and the EMSs, wherein a resource adaptor of the resource adapters performs operations to:
obtain, from a configuration management database (CMDB) credential information associated with a configuration item (CI) that is representative of an EMS or a computing asset managed by an EMS, and
obtain, using the credential information, data regarding a computing asset from the EMS based on a computing asset-specific protocol;
associate, based on the interrogating, the computing assets with the network services in a configuration management database (CMDB);
assign respective asset stake values to the computing assets;
receive a request to obtain a transaction validation stake from a transaction validator;
unify, into a unified model, data regarding network, physical, and logical computing assets with stakeholder data and validators data, wherein the unifying utilizes at least one federation tool that synchronizes information from multiple Operational Support Systems (OSSs), including at least some of the EMSs, by querying the multiple OSSs to identify and associate the computing assets with respective network services and respective stakeholders, wherein the unified model facilitates identification of computing assets for assignment based on a subset of the network services used by the transaction validator by querying the CMDB;

assign at least some of the computing assets to the transaction validator, wherein to assign the at least some of the computing assets to the transaction validator comprises to:

identify, in the CMDB, the computing assets based on a subset of the network services used by the transaction validator by querying the CMDB to identify the computing assets associated with the subset of the network services; and responsive to a request for one or more transaction validators to perform a validation, provide a response that includes an indication of the transaction validator, wherein the transaction validator is selected based on the transaction validation stake.

8. The system of claim 7, wherein to assign the respective asset stake values to the computing assets comprises to:
assign at least some of the respective asset stake values to at least some of the computing assets based on respective relative values of the at least some of the computing assets.

9. The system of claim 7, wherein to assign the at least some of the computing assets to the transaction validator further comprises to:
set the transaction validation stake of the transaction validator to a sum of respective asset stake values of the at least some of the computing assets.

10. The system of claim 9, wherein the one or more processors are further configured to execute the instructions to:
receive a request to reduce the transaction validation stake of the transaction validator by a given value; and
reduce the transaction validation stake by the given value.

11. The system of claim 7, wherein the one or more processors are further configured to execute the instructions to:
receive a public key associated with the transaction validator and respective public keys associated with delegate validators of the transaction validator;
associate, in a data store, the public key with the transaction validator;
associate, in the data store, the respective public keys with the delegate validators; and
associate, in the data store, the transaction validator with the delegate validators.

12. The system of claim 11, wherein to provide a response that includes an indication of the transaction validator comprises to include, in the response:
the public key of the transaction validator; and
the respective public keys of the delegate validators.

13. The system of claim 7, wherein to assign the at least some of the computing assets to the transaction validator further comprises to
identify a subset of the computing assets that are used by the transaction validator, wherein the subset of the computing assets includes the at least some of the computing assets.

14. One or more non-transitory computer readable media storing instructions operable to cause one or more processors to perform operations comprising:
interrogating a computing infrastructure, by a path discovery tool, to discover computing assets associated with network services, wherein interrogating the computing infrastructure by the path discovery tool comprises:

communicating, by the path discovery tool, with the computing assets and Element Management Systems (EMSs) that manage respective network elements, via resource adapters programmed to interface with respective computing asset types and the EMSs, wherein a resource adaptor of the resource adapters performs operations comprising:

obtaining, from a configuration management database (CMDB), credential information associated with a configuration item (CI) that is representative of an EMS or a computing asset managed by an EMS, and obtaining, using the credential information, data regarding a computing asset from the EMS based on a computing asset-specific protocol;

associating, based on the interrogating, the computing assets with the network services in a configuration management database (CMDB);

assigning by an asset holder device, respective asset stake values to the computing assets;

receiving, by the asset holder device, a request to obtain a transaction validation stake from a transaction validator, wherein the request includes a public key of the transaction validator and respective keys of delegate validators associated with the transaction validator;

unifying, into a unified model, data regarding network, physical, and logical computing assets with stakeholder data and validators data, wherein the unifying utilizes at least one federation tool that synchronizes information from multiple Operational Support Systems (OSSs), including at least some of the EMSs, by querying the multiple OSSs to identify and associate the computing assets with respective network services and respective stakeholders, wherein the unified model facilitates identification of computing assets for assignment based on a subset of the network services used by the transaction validator by querying the CMDB;

assigning, by a validator provider device and based on the asset stake values, at least some of the computing assets to the transaction validator, wherein the assigning by the validator provider device comprises:

identifying, in the CMDB, the computing assets based on a subset of the network services used by the transaction validator by querying the CMDB to identify the computing assets associated with the subset of the network services; and responsive to a request for one or more transaction validators to perform a validation, providing, by the validator provider device, a response that includes the public key and the respective keys of delegate validators.

15. The one or more non-transitory computer readable media of claim 14, wherein assigning the respective asset stake values to the computing assets of the network services comprises:
assigning at least some of the respective asset stake values to at least some of the computing assets of the network services based on respective costs of the at least some of the computing assets.

16. The one or more non-transitory computer readable media of claim 14, wherein assigning the at least some of the computing assets to the transaction validator comprises:
setting the transaction validation stake of the transaction validator to a sum of respective asset stake values of the at least some of the computing assets.

17. The one or more non-transitory computer readable media of claim 16, wherein the operations further comprise:

receiving a request to reduce the transaction validation stake of the transaction validator by a given value; and reducing the transaction validation stake by the given value.

18. The one or more non-transitory computer readable media of claim 14, wherein the transaction validator is selected using the respective asset stake values of the at least some of the computing assets that are assigned to the one or more transaction validators.

* * * * *